United States Patent [19]

Coon

[11] 4,072,222

[45] Feb. 7, 1978

[54] SINGLE STROKE CONTROL SYSTEM

[76] Inventor: George M. Coon, Hillside House, Saybrook Road, Essex, Conn. 06426

[21] Appl. No.: 753,596

[22] Filed: Dec. 22, 1976

[51] Int. Cl.[2] ...................... B30B 15/14; F16D 67/04; F16D 71/00

[52] U.S. Cl. ............................ 192/131 R; 192/12 C; 100/53

[58] Field of Search ................. 192/12 C, 131 R, 144; 100/53

[56] References Cited

U.S. PATENT DOCUMENTS

| | | | |
|---|---|---|---|
| 3,004,647 | 10/1961 | Andrus et al. | 192/131 R |
| 3,509,976 | 5/1970 | Coon | 192/12 C X |
| 3,749,005 | 7/1973 | Einecker et al. | 192/131 R X |
| 3,889,503 | 6/1975 | Luenser | 192/131 R X |

*Primary Examiner*—Allan D. Herrmann

*Attorney, Agent, or Firm*—Oltman and Flynn

[57] ABSTRACT

A single cycle control system for a press or the like in which interrupted stroke protection is combined with novel interconnections of the control components in the system such that the failure of any single control component cannot endanger the operator of the machine. Relay failure (even a simultaneous failure of two) is completely eliminated as a possible source of an unexpected repeat stroke of the machine. The solenoids for operating the air valves that control the operation of the machine are energized initially through the usual run switches for the machine, after which these solenoids are kept energized through separate holding circuits which include limit switches operated by the machine and switches operated by the respective air valves.

20 Claims, 6 Drawing Figures

Fig. 1
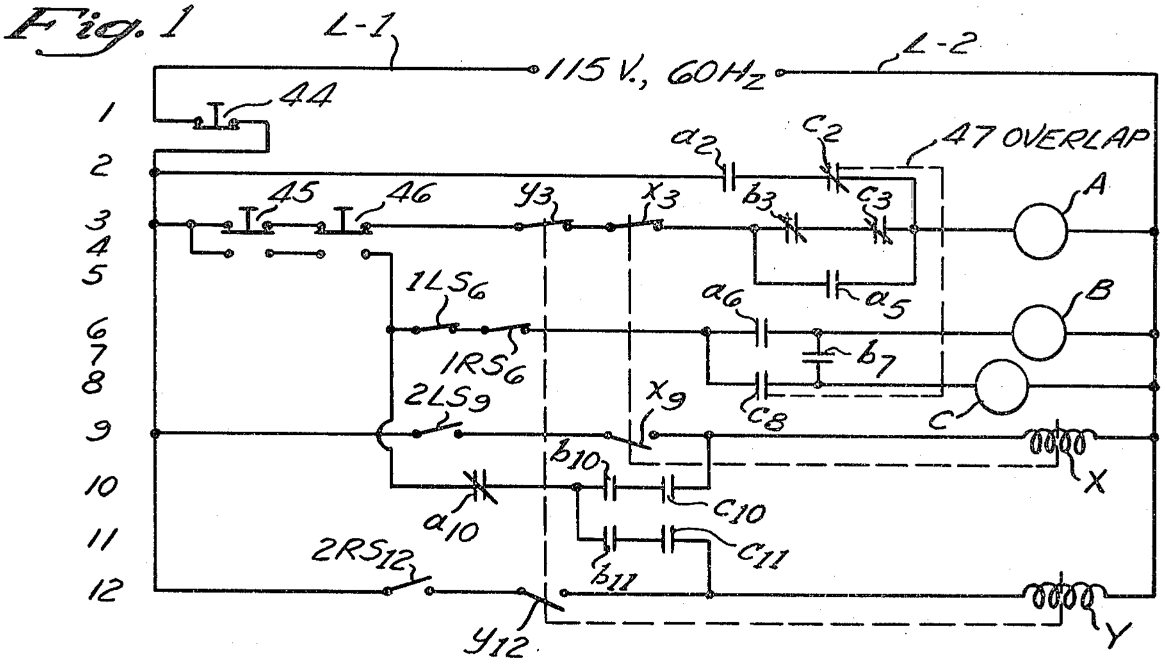
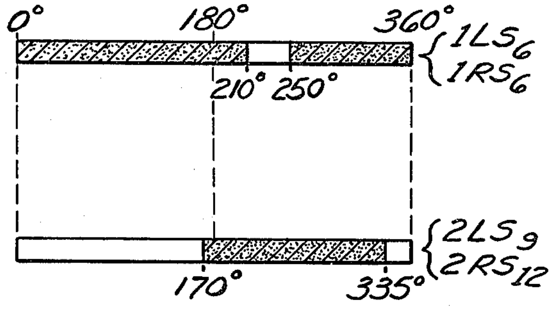
Fig. 2
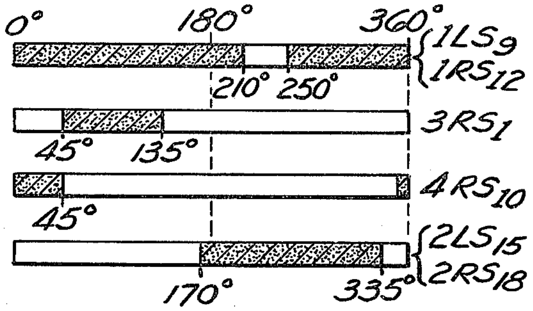
Fig. 5
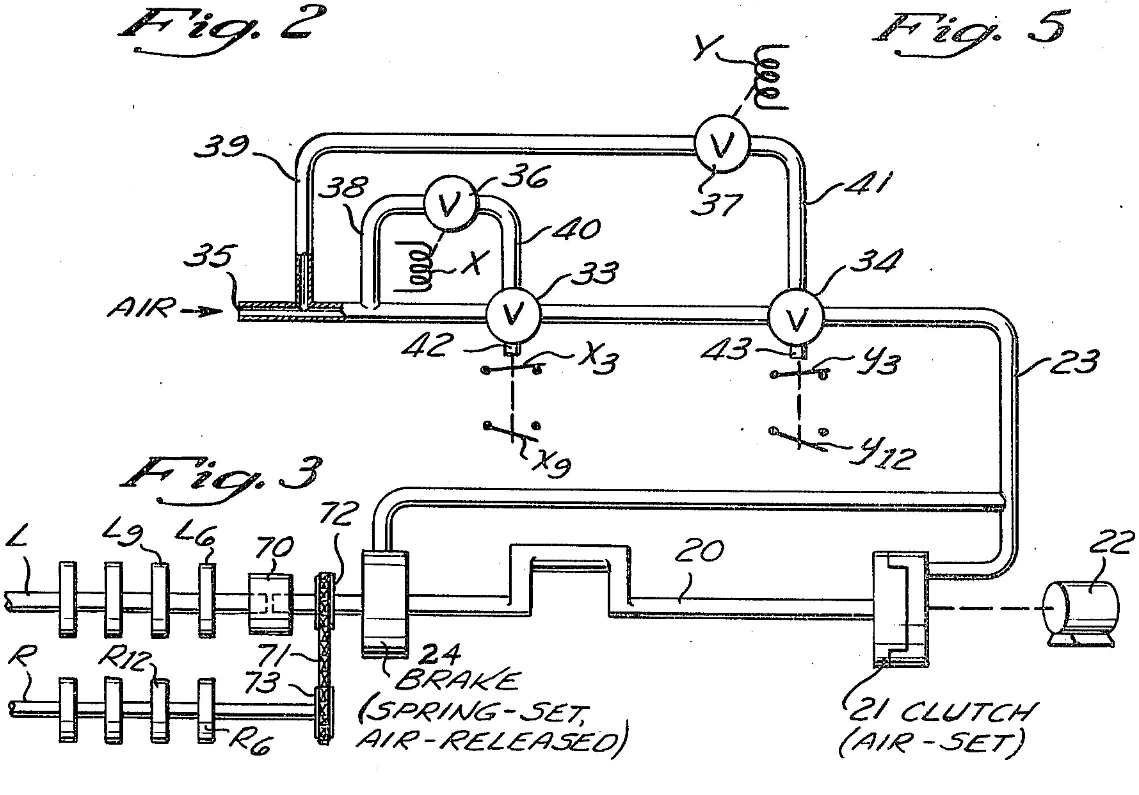
Fig. 3

Fig. 4
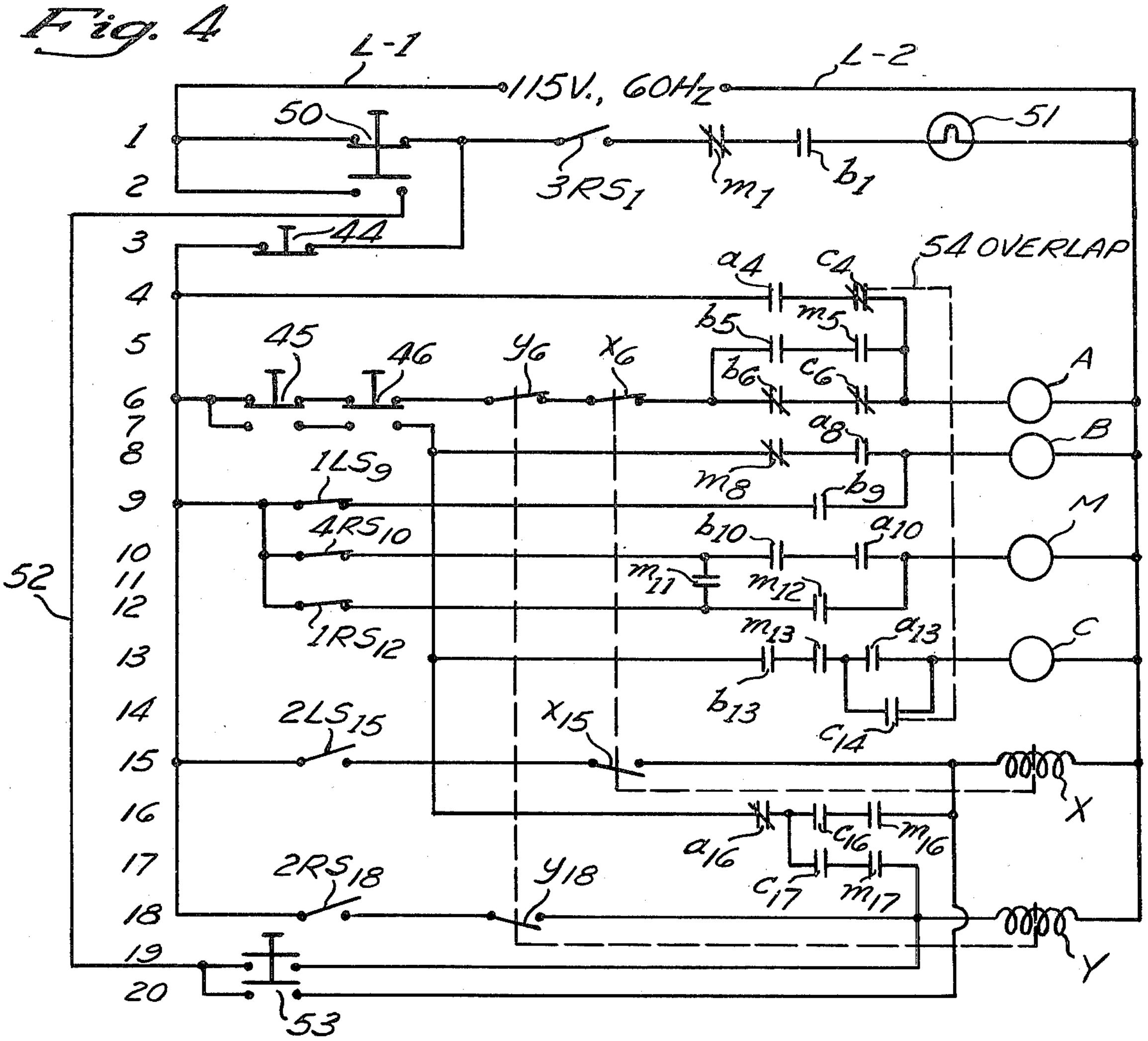
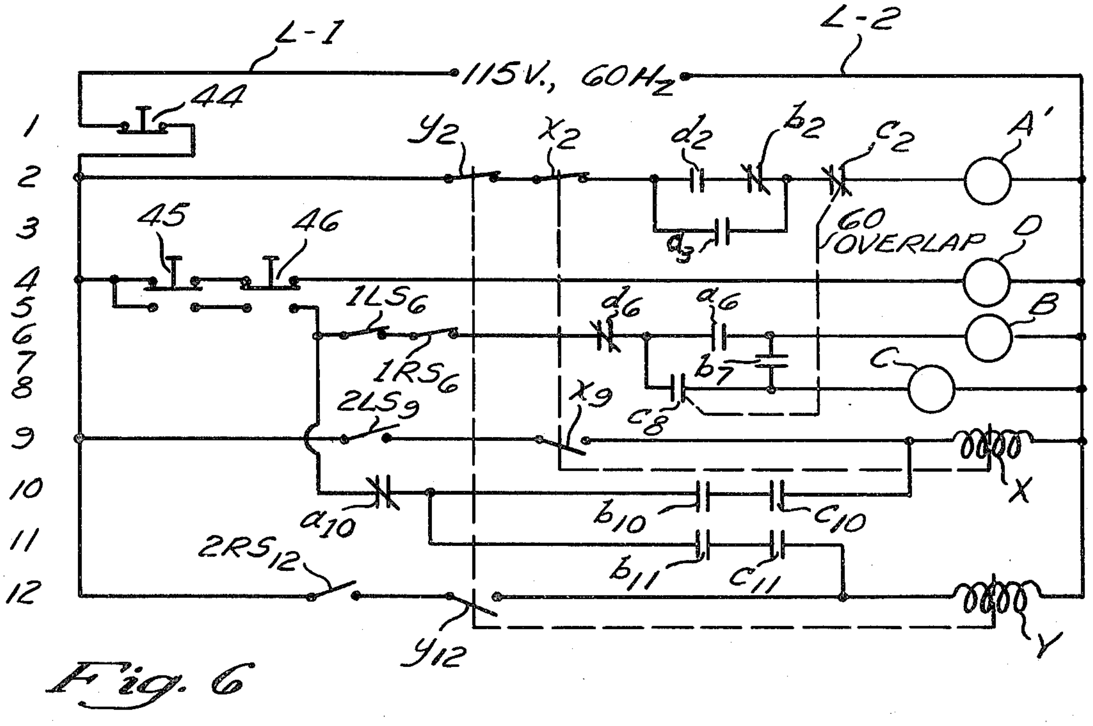
Fig. 6

SINGLE STROKE CONTROL SYSTEM

BACKGROUND OF THE INVENTION

U.S. Pat. No. 3,004,647 to Everett H. Andrus and George M. Coon and U.S. Pat. No. 3,509,976 to George M. Coon disclose control systems for limiting a machine, such as a punch press, to a single cycle of operation and having provision for insuring that a failure of any of the various control components in the system cannot result in an unexpected repeat stroke of the machine which might endanger the operator.

SUMMARY OF THE INVENTION

The present invention is directed to a control system for the same general purpose but which is appreciably simplified over the systems of the above-mentioned patents and which still insures against a repeat stroke or other hazardous operation of the machine in the event of a failure of any control component in the system which is critical to the operator's safety.

A notable feature of the present system is that one category of its control components, namely, the relays, is completely eliminated as a possible source of danger to the machine operator, even if two of them fail simultaneously. In no event can the failure of one or more relays produce an unexpected repeat stroke of the machine. That leaves only the valves and the limit switches as the types of control components whose failure might endanger the operator. In the present system a dangerous condition could occur only if certain limit switches and a corresponding valve fail at the same time, and this is virtually a mathematical impossibility, as explained hereinafter.

In accordance with the present invention, the active dual-control concept which underlies the system of U.S. Pat. No. 3,004,647 is combined in a novel and simplified manner with the "interrupted stroke protection" feature now mandated by the federal Occupational Safety and Health Administration, commonly referred to as "OSHA". In the present system, as few as three relays may be required. Alternatively, a fourth relay may be added and its circuitry so integrated into the three relay system as to monitor the condition of the brake, which is now a mandated OSHA requirement.

A principal object of this invention is to provide a novel and simplified single cycle control system for a machine.

Another object of this invention is to provide such a system which has relatively few relays and other control components and yet is capable of monitoring, during each stroke of the machine, the operation of every control component that is critical to the safety of the operator of the machine.

Another object of this invention is to provide such a control system which provides interrupted stroke protection in addition to an active dual control arrangement for protecting the machine operator from danger in case one of the control components in the system happens to fail.

Another object of this invention is to provide a novel single stroke system which completely eliminates the relays as one of the categories of control components whose operation is important to the machine operator's safety, leaving only the valves and the limit switches as the critical components from the safety standpoint.

Further objects and advantages of this invention will be apparent from the following detailed description of three presently-preferred embodiments thereof, shown in the accompanying drawings in which:

FIG. 1 is a schematic electrical circuit diagram of the basic three-relay embodiment of the present system;

FIG. 2 is a timing chart showing the condition of the cam-operated limit switches in the FIG. 1 system throughout each cycle of operation of the machine;

FIG. 3 shows schematically the drive for the crankshaft of the machine, together with the air-operated control for starting and stopping the machine;

FIG. 4 is a schematic electrical circuit diagram of a second embodiment of the present control system, which includes a fourth relay for monitoring the brake;

FIG. 5 is a timing chart showing the condition of the cam-operated limit switches in the FIG. 4 system throughout each cycle of operation of the machine; and FIG. 6 is a schematic electrical circuit diagram of a third embodiment of the present control system, which includes a fourth relay whose sole function is to monitor the normal presence of the run switches.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring first to FIG. 3, the rotary crankshaft 20 of the machine is connected through a clutch 21 to a continuously operating drive motor 22. The machine itself may be a punch press or any other machine intended to have single stroke operation for the operator's safety. Normally, in the absence of air pressure in line 23, the clutch is disconnected so that the motor 22, even though energized, does not drive the crankshaft 20. The crankshaft also is provided with a brake 24 which is spring-set to lock the crankshaft against movement. However, when air pressure appears in line 23, the brake is released.

Two camshafts L and R (FIG. 3) are coupled to the crankshaft 20 to be rotated by it. Camshaft L is coupled to the crankshaft through a shaft coupling 70 of conventional design. Camshaft R is coupled to the crankshaft through a chain 71 driven by a sprocket 72 on the crankshaft and, in turn, driving a sprocket 73 on camshaft R. Thus, there are two separate mechanical couplings from the crankshaft 20 to the two camshafts.

The first camshaft L carries two cams $L_6$ and $L_9$, which operate similarly designated limit switches $\mathbf{1LS_6}$ and $\mathbf{2LS_9}$ in the FIG. 1 control circuit, as explained hereinafter.

Similarly, the second camshaft R carries two cams $R_6$ and $R_{12}$, which operate corresponding limit switches $\mathbf{1RS_6}$ and $\mathbf{2RS_{12}}$ in FIG. 1.

As shown in FIG. 2, the first limit switch $\mathbf{1LS_6}$ operated by camshaft L and the first limit switch $\mathbf{1RS_6}$ operated by the other camshaft R are both closed from 0° to about 210° of the crankshaft rotation, open from 210° to about 250°, and closed again from 250° to 360°. The second limit switch $\mathbf{2LS_9}$ operated by camshaft L and the second limit switch $\mathbf{2RS_{12}}$ operated by camshaft R are both open from 0° to about 170°, closed from 170° to about 335°, and open again from about 335° to 360°.

The air supply to line 23 for releasing the brake 24 and engaging the clutch 21 is under the control of a pair of poppet valves 33 and 34 which are connected in series in the air line between the air inlet 35 and line 23. Poppet valve 33 is under the control of a pilot valve 36 operated by a first solenoid X. Similarly, poppet valve 34 is under the control of a pilot valve 37 operated by a second solenoid Y. Each pilot valve and poppet valve combination preferably is of the type shown in FIG. 4 of U.S. Pat. No. 3,004,647. Each of the pilot valves is normally open and each has its inlet connected to the air inlet 35 ahead of the first poppet valve 33, through separate lines 38 and 39, respectively. The outlet line 40 from pilot valve 36 is connected to the poppet chamber in valve 33 to maintain valve 33 closed normally, i.e., when pilot valve 36 is open. Similarly, the outlet line 41 from pilot valve 37 is connected to the poppet chamber in valve 34 to maintain valve 34 closed when pilot valve 37 is open.

When solenoid X is energized, it closes pilot valve 36 and the first poppet valve 33 opens. The first poppet valve 33 is provided with a plunger 42 connected to the movable valve element in this valve and projecting beyond the valve casing. Plunger 42 operates a pair of switches $x_3$ and $x_9$. These switches are incorporated in a double-pole switch unit of known construction. Normally (i.e., with pilot valve 36 open and poppet valve 33 closed) the plunger is in its extended position beyond the valve casing and maintains switch $x_3$ closed and switch $x_9$ open, as shown in FIG. 3. When poppet valve 33 opens, in response to the energization of solenoid X and the closing of pilot valve 36, as described, the plunger 42 is retracted and switch $x_3$ opens and switch $x_9$ closes.

In like manner, the second poppet valve 34 is provided with a plunger 43 which operates a pair of switches $y_3$ and $y_{12}$. Normally (i.e., when poppet valve 34 is closed), the plunger 43 is in its extended position and maintains switch $y_3$ closed and switch $y_{12}$ open. When valve 34 opens, as described, the plunger 43 is retracted and switch $y_3$ opens and switch $y_{12}$ closes.

3-RELAY CONTROL CIRCUIT —FIG. 1

FIG. 1 shows a circuit diagram of a 3-relay embodiment of the present control circuit, with the lines numbered for convenience of description. The three relays are: first, a dummy plug and component checking relay A in line 3; second, an anti-repeat relay B in line 6; and third, an interrupted stroke relay C in line 8. These relays have correspondingly lettered sets of contacts in the various lines of FIG. 1. The different sets of contacts are lettered according to the relay of which they are a part, together with a number subscript corresponding to the number of the line in which they appear.

The power supply lines L-1 and L-2 are connected across a suitable A.C. power supply, preferably 110–120 volts, 60 Hz.

Line 1 in FIG. 1 includes a normally-closed, manually operable stop switch 44 connected to power line L-1.

Line 3 includes, in series between the stop switch 44 and the second power line L-2, the normally-closed contacts of two run switches 45 and 46, the normally-closed valve switch $y_3$ associated with poppet valve 34 in FIG. 3, the normally-closed valve switch $x_3$ associated with poppet valve 33, a normally-closed set of contacts $b_3$ of the anti-repeat relay B, a normally-closed set of contacts $c_3$ of the interrupted stroke relay C, and the coil of the dummy plug and component checking relay A.

Line 2 includes, in series between stop switch 44 and the coil of relay A (in line 3), a set of normally-open contacts $a_2$ of the dummy plug and component checking relay A, and a set of normally-closed contacts $c_2$ of the interrupted stroke relay C.

Line 4 includes the normally-open contacts of the two run switches 45 and 46.

Line 5 includes a normally-open set of contacts $a_5$ of relay A, connected across the series-connected relay contacts $b_3$ and $c_3$ in line 3.

Line 6 includes, in series between the normally-open contacts of the second run switch 46 (in line 4) and the power supply line L-2, the cam-operated limit switches 1LS$_6$ and 1RS$_6$, a normally-open set of contacts $a_6$ of relay A, and the coil of the anti-repeat relay B.

Line 8 includes, in series between limit switch 1RS$_6$ (in line 6) and the power line L-2, a set of normally-open contacts $c_8$ of the interrupted stroke relay C and the coil of this relay.

Line 7 includes a normally-open set of contacts $b_7$ of relay B, connected between the coils of relays B and C.

Line 9 includes, in series between the stop switch 44 and the other power line L-2, the cam-operated limit switch 2LS$_9$, the normally-open valve switch $x_9$ associated with poppet valve 33 in FIG. 2 and the solenoid X for pilot valve 36 in FIG. 3. This line provides a first holding circuit which is connected directly to the first solenoid X.

Line 10 includes, in series between the normally-open contacts of run switch 46 (in line 4) and the valve solenoid X (in line 9), a set of normally-closed contacts $a_{10}$ of relay A, a set of normally-open contacts $b_{10}$ of relay B, and a set of normally-open contacts $c_{10}$ of relay C.

Line 12 includes, in series between the stop switch 44 and power line L-2, the cam-operated limit switch 2RS$_{12}$, the normally-open valve switch $y_{12}$ associated with poppet valve 34 in FIG. 3, and the solenoid Y for pilot valve 37 in FIG. 3. This line provides a second holding circuit which is connected directly to the second solenoid Y and is separate from the aforementioned "first holding circuit" (line 9) for the first solenoid X.

Line 11 includes a set of normally-open contacts $b_{11}$ of relay B and a set of normally-open contacts $c_{11}$ of relay C, which are connected between the relay contacts $a_{10}$ (in line 10) and the valve solenoid Y (in line 12).

OPERATION

In the operation of the FIG. 1 control circuit, when lines L-1 and L-2 are plugged into the power supply the dummy plug and component checking relay A is energized through line 3 by way of the normally-closed contacts of the run switches 45 and 46, the normally-closed valve switches $y_3$ and $x_3$, and the normally-closed relay contacts $b_3$ and $c_3$. When relay A is initially energized in this manner, it completes a holding circuit for itself in line 2 by closing its normally-open contacts $a_2$ there. Also, its contacts $a_5$ in line 5 are closed, making the continued energization of relay A independent of the relay contacts $b_3$ and $c_3$ in line 3. Also, the now-energized relay A closes its contacts $a_6$ in line 6, and opens its contacts $a_{10}$ in line 10.

To initiate a single stroke operating cycle of the machine, the machine operator depresses both run switches 45 and 46, thus opening line 3 and closing the normally-open run switch contacts in line 4. Relay A remains energized via line 2.

The anti-repeat relay B now becomes energized through the run switches 45 and 46, the now-closed, cam-operated limit switches 1LS$_6$ and 1RS$_6$, and the now-closed relay contacts $a_6$ in line 6. When thus energized, the anti-repeat relay B closes its normally-open contacts $b_7$ in line 7 and thereby completes an initial energization circuit for the interrupted stroke relay C. Relay B also opens its contacts $b_3$ in line 3, closes its contacts $b_{10}$ in line 10, and closes its contacts $b_{11}$ in line 11.

When relay C is energized, in response to the energization of anti-repeat relay B, it closes its contacts $c_{10}$ and $c_{11}$. In addition, when energized, relay C closes its normally-open contacts $c_8$ and thereby completes a holding circuit which makes relay C independent of the continued energization of relays A and B. The energization of relay C causes its contacts $c_2$ in line 2 to open, thereby breaking the holding circuit for relay A and causing the latter to be de-energized. This causes the relay contacts $a_6$ in line 6 to open but the anti-repeat relay B remains energized through the now-closed relay contacts $c_8$ and $b_7$. Also, the interrupted stroke relay C remains energized through its contacts $c_8$. There is an overlap between the $c_2$ and $c_8$ contacts such that the $c_8$ contacts close before the $c_2$ contacts open, both in response to the energization of relay C. This overlap is indicated schematically by the dashed line 47 in FIG. 1. (It is to be understood that the run switches 45 and 46 are being held depressed, and for the machine operator's safety they are to be held down until the crankshaft 20 of the machine has gone through at least 170° of its rotation.)

The de-energization of relay A in response to the energization of relay C, as just described, causes its contacts $a_{10}$ to re-close, thereby completing an energization circuit for valve solenoid X via line 10 and completing an energization circuit for valve solenoid Y via lines 10 and 11.

The energization of the valve solenoids X and Y causes the poppet valves 33 and 34 in FIG. 3 to open, thereby supplying air under pressure to the clutch 21 and the brake 24 to engage the clutch and release the brake. Accordingly, the crankshaft 20 of the machine begins to rotate. Also, the valve switches $x_9$ and $y_{12}$ are closed and the valve switches $y_3$ and $x_3$ are opened.

After the crankshaft and the cam shafts have rotated through about 170°, the cam-operated limit switches $2LS_9$ and $2RS_{12}$ are closed, thereby completing separate holding circuits (via lines 9 and 12) to maintain the valve solenoids X and Y energized independent of relays A, B and C. Consequently, the run switches 45 and 46 may be released now. This de-energizes relays B and C but the valve solenoids X and Y remain energized through the just-mentioned holding circuits in lines 9 and 12.

When the crankshaft and camshaft rotation reaches about 210°, the cam-operated limit switches $1LS_6$ and $1RS_6$ are opened, and then they are re-closed at about 250° of the crankshaft rotation, for a purpose explained hereinafter.

At about 335° of the crankshaft rotation, the cam-operated limit switches $2LS_9$ and $2RS_{12}$ are re-opened, thereby breaking the holding circuits (lines 9 and 12) for the valve solenoids X and Y and causing these solenoids to become de-energized. Consequently, the poppet valves 33 and 34 in FIG. 2 close, cutting off the pressurized air supply to the clutch 21 and the brake 24. The time delay in the operation of the brake is such that, if operating properly, it will brake the crankshaft to a stop at top dead center (360°).

With the run switches 45 and 46 released, relays B and C de-energized, and valve solenoids X and Y de-energized, the dummy plug and component checking relay A will be energized again via line 3. Now the machine is ready for another single cycle operating stroke.

There are two intervals during each stroke of a press where an extremely hazardous condition would occur if the control system were to fail to stop the press.

One of these intervals is from about 90° to 170° of crankshaft rotation if the machine operator releases one of the run switches 45 or 46. In the present system a failure to stop the press at this time could happen only if both solenoids X and Y remain energized despite the opening of one or both of the run switches in their energization circuit. There is an extremely high degree of mathematical improbability that all of these failures would occur simultaneously. Therefore, the possibility of a failure of this control system at this hazard interval is virtually non-existent.

The second dangerous interval in each cycle of the press is at its 360° (dead center) position. Absent a brake failure as discussed hereinafter with reference to FIG. 4, a failure to stop there could occur only if both of the cam-operated limit switches $2LS_9$ and $2RS_{12}$ fail to re-open near the end of the cycle, or if both poppet valves 33 and 34 fail to close, or if one valve 33 or 34 fails to close and the cam-operated limit switch $2RS_{12}$ or $2LS_9$ in the holding circuit for the valve solenoid Y or X of the other poppet valve's pilot valve fails to re-open. Here again, the possibility of such simultaneous failure of two such separate control components in the system is virtually negligible.

If, on the downward stroke of the machine, the motion of the press slide or other moving part is stopped for any reason, the present control system insures that both run switches 45 and 46 must be released and then depressed again before the motion can be resumed. This prevents the operator from stopping the downstroke of the press slide by releasing one run switch and then resuming the downstroke by depressing that same run switch. The operator might attempt to do this for the purpose of freeing one of his hands, which might then be vulnerable to the downstroke of the machine instead of being up out of the way at the corresponding run switch throughout substantially the complete downstroke.

In the FIG. 1 system, from zero degrees to 170° of the crankshaft rotation both run switches 45 and 46 must be held depressed continuously or else the energization circuits for the valve solenoids X and Y will be broken. If either run switch is released during this downstroke interval, the machine will stop and it cannot be restarted until the other run switch is released (so that relay A can be energized again) and then both run switches are depressed again to energize relays B and C again for re-establishing the energization circuits for valve solenoids X and Y, as described.

If the machine operator attempts to "beat" the FIG. 1 control system by holding the run switches 45 and 46 depressed when the crankshaft has completed its 360° of rotation, the cam-operated limit switches $1LS_6$ and $1RS_6$ will prevent a repeat stroke because by opening at 210° they de-energize the anti-repeat relay B and the interrupted stroke relay C.

Relay A acts as both a dummy plug relay and a component checking relay in the FIG. 1 circuit.

In actual practice a machine may have more than one station where the machine operator may be situated, for example, at each corner of a press, or the machine may have more than one operator. The normal practice is to have pairs of run switches mounted on portable stands and connected to a male plug there. An electrical receptacle for receiving such a plug may be located at each corner of the press, for example.

If there is to be no operator there, a dummy plug may be inserted into the receptacle. This dummy plug provides closed circuit paths for the lines which would otherwise contain the normally-open contacts and the normally-closed contacts of the two run switches. There have been instances in which such dummy plugs were inserted in all the receptacles at the different work stations for the press, so that the press would make a stroke, then stop at top dead-center and then make another stroke, and so on until the power supply for the press was shut down to correct the situation.

In the FIG. 1 circuit one of the functions (but not the only function) of relay A is to prevent such dangerous situations from occurring. Thus, if the run switches 45 and 46 and their male plug were removed from the receptacle and replaced by a dummy plug, valve switch $y_3$ in line 3 and cam-operated limit switch 1SL$_6$ in line 6 would be connected directly to power line L-1 through switch 44. Relay A would be energized when the valve switches $y_3$ and $x_3$ re-close near the end of a stroke, and in turn relays B and C would be energized. However, when relay C became energized and its $c_2$ contacts would open, relay A would remain energized through its $a_5$ contacts. With relay A continuing to be energized, its $a_{10}$ contacts would be open and the valve solenoids X and Y could not be energized. Consequently, a stroke of the machine could not take place.

Another function of relay A is to monitor the performance of several other control components in the system, as explained in detail hereinafter.

INTERRUPTED STROKE

In case the machine operator releases either or both of the run switches 45 and 46 during the downstroke before the crankshaft 20 has reached the 170° rotational position, the valve solenoids X and Y will be de-energized and the crankshaft will stop, as follows:

The release of either run switch will open the circuit to relay C (via the latter's contacts $c_8$) and the circuit to relay B (via the $c_8$ and $b_7$ contacts). Consequently, relays B and C will de-energize the valve solenoids X and Y, causing the brake 24 to be applied and the clutch 21 to be released for stopping the crankshaft.

To restart the crankshaft, relay A must be re-energized by releasing both run switches 45 and 46 to complete the energization circuit for relay A via line 3. With relay A now energized, its contacts $a_6$ on line 6 enable relay B to be energized again by depressing both run switches 45 and 46. Such energization of relay B causes relay C to be energized again, as already described, and the valve solenoids X and Y become energized to start the crankshaft again.

MONITORING

All components of the FIG. 1 circuit are monitored in a fail-safe fashion during each cycle of the machine, except the cam-operated limit switches 1LS$_6$ and 1RS$_6$ in line 6. However, the failure of either of these switches to re-open before the crankshaft reaches its dead-center (360°) position would not cause a repeat stroke of the machine. Instead, such a repeat stroke could occur only if both limit switches 1LS$_6$ and 1RS$_6$ failed to re-open while both run switches 45 and 46 were being held depressed by the machine operator. Even in this very unlikely event, there would be no danger to the machine operator because his hands would be on the run switches and out of the way of the vertically reciprocable part of the machine.

The monitoring of the various components of the system takes place as follows:

Relay A must be energized or else relays B and C will not be energized, and later in the cycle relay A must be de-energized or else valve solenoids X and Y will not be energized.

Relay B must be energized or else relay C will not be energized, and later in the cycle relay B must be de-energized in order for relay A to be energized again at the end of the cycle via line 3 for the next machine stroke to take place.

Relay C must be energized or else valve solenoids X and Y will not be energized, and later in the cycle relay C must be de-energized in order for relay A to be energized again at the end of the cycle via line 3 for the next machine stroke to take place.

As noted above, relay A must be energized as a precondition to starting a cycle. For this relay to be energized the following must have taken place during and after the preceding cycle:

(a) Run switches 45 and 46 must have been released so their normally-closed contacts can close;

(b) Limit switch contact $y_3$ must have closed, thus indicating that valve Y is closed;

(c) Limit switch contact $x_3$ must have closed, thus indicating that valve X is closed;

(d) Contacts $b_3$ would have to be closed, thus indicating that relay B is de-energized; and (e) Contacts $c_3$ would have to be closed, thus indicating that relay C is de-energized.

In line 9, if the cam-operated limit switch 2LS$_9$ fails to close, then the machine would stop when the run switches 45 and 46 are released or the limit switches 1LS$_6$ and 1RS$_6$ are opened at 210°, whichever occurs first. If switch 2LS$_9$ fails to open, then it would keep valve solenoid X energized and poppet valve 33 would remain open, holding valve switch $x_3$ open and thereby preventing relay A form being energized again. Therefore, the next machine stroke could not take place.

In line 12, if the cam-operated limit switch 2RS$_{12}$ fails to close, then the machine would stop when the run switches are released or the limit switches 1LS$_6$ and 1RS$_6$ open at 210°; whichever occurs first. If limit switch 2RS$_{12}$ fails to open, then it would keep the valve solenoid Y energized and poppet valve 34 would remain open, holding valve switch $y_3$ open and thereby preventing relay A from being energized again. Consequently, the next machine stroke could not occur.

Thus, by themselves, the failure of both B and C relays simultaneously, either one of the valves, or either one of the rotating cam limit switches in this system cannot result in a condition or action is hazardous to the person operating the machine.

FIGURE 4 CONTROL CIRCUIT — WITH BRAKE MONITORING

FIG. 4 shows a modification of the present control system which differs primarily from FIG. 1 in that it has an additional relay for brake monitoring purposes.

The coil of the brake monitor relay M is in line 10 of FIG. 6, and this relay has a set of normally-closed contacts $m_1$ in line 1, a set of normally-open contacts $m_5$ in line 5, a set of normally-closed contacts $m_8$ in line 8, and respective sets of normally-open contacts $m_{11}$, $m_{12}$, $m_{13}$, $m_{16}$ and $m_{17}$ in lines 11, 12, 13, 16 and 17.

In addition to the dummy plug and component checking relay A, the anti-repeat relay B, and the interrupted stroke relay C, this system has a first cam-operated limit switch $1LS_9$ in line 9 operated by one camshaft L, a second cam-operated limit switch $2LS_{15}$ in line 15 operated by this same camshaft (and corresponding to the limit switch $2LS_9$ in FIG. 1), a cam-operated limit switch $1RS_{12}$ in line 12 which is operated by the other camshaft R, a second cam-operated limit switch $2RS_{18}$ in line 18 which is operated by the camshaft R (and corresponding to the limit switch $2RS_{12}$ in FIG. 1), and cam-operated limit switches $3RS_1$ and $4RS_{10}$ in lines 1 and 10, respectively, which are operated by the camshaft R (which have no counterparts in the FIG. 1 system). The timing diagrams for these cam-operated limit switches in the FIG. 4 circuit are shown in FIG. 5.

In FIG. 4, line 1 includes, in series across the power lines L-1 and L-2, the "single stroke" contacts of a three-position switch 50, the limit switch $3RS_1$, the normally-closed contacts $m_1$ of brake monitor relay M, the normally-open contacts $b_1$ of anti-repeat relay B, and a brake fault pilot light 51.

Switch 50 is shown in its position for single stroke operation of the machine. In a second position, for "inching" operation of the machine, this switch closes its contacts in line 2 to connect the power line L-1 to a line 52 leading to two sets of normally-open contacts of an "inch" switch 53 in lines 19 and 20. Switch 50 has an "off" position, midway between its "single stroke" and "inch" positions, in which the switch contacts are open in both lines 1 and 2.

Line 3 includes the normally-closed stop switch 44, connected to the "single stroke" contacts of the selector switch 50 (in line 1).

Lines 4, 6 and 7 includes the same switches and relay contacts between the stop switch 44 and relay A as lines 2, 3 and 4, respectively, of FIG. 1.

Line 5 includes a set of normally-open contacts $b_5$ of the anti-repeat relay B and a set of normally-open contacts $m_5$ of the brake monitor relay M connected in series with each other across the series-connected $b_6$ and $c_6$ relay contacts in line 6.

Line 8 includes, in series between the normally-open contacts of the second run switch 46 and the anti-repeat relay B, a set of normally-closed contacts $m_8$ of the brake monitor relay M and a set of normally-open contacts $a_8$ of relay A.

Line 9 includes, in series between the stop switch 44 and relay B, the cam-operated limit switch $1LS_9$ and a set of normally-open contacts $b_9$ of relay B.

Line 10 includes, in series between the stop switch 44 and power line L-2, the cam-operated limit switch $4RS_{10}$, a set of normally-open contacts $b_{10}$ of relay B, a set of normally-open contacts $a_{10}$ of relay A, and the coil of the brake monitor relay M.

Line 12 includes, in series between the stop switch 44 and relay M, the cam-operated limit switch $1RS_{12}$ and a set of normally-open contacts $m_{12}$ of relay M.

Line 11 includes a set of normally-open contacts $m_{11}$ of relay M connected between the limit switches $4RS_{10}$ and $1RS_{12}$.

Line 13 includes, in series between the normally-open contacts of the second run switch 46 and power line L-2, a set of normally-open contacts $b_{13}$ of the anti-repeat relay B, a set of normally-open contacts $m_{13}$ of the brake monitor relay M, a set of normally-open contacts $a_{13}$ of relay A, and the coil of the interrupted stroke relay C.

Line 14 includes a set of normally-open holding contacts $c_{14}$ or relay C which are connected across the $a_{13}$ contacts in line 13.

Lines 15, 16, 17 and 18 include the same switches, relay contacts and valve solenoids as lines 9, 19, 11 and 12, respectively, of FIG. 1.

Line 19 includes a first set of normally-open contacts of the "inch" switch 53, which are connected between line 52 and the valve solenoid Y in line 18.

Line 20 includes a second set of normally-open contacts of the "inch" switch 53, which are connected between line 52 and the valve solenoid X in line 15.

OPERATION

With the selector switch 50 in line 1 positioned as shown, the stop switch 44 in line 3 closed, and the run switches 45, 46 in their normal (undepressed) position, relay A is energized initially via line 6 in the manner already described in detail for FIG. 1. When so energized, relay A closes its $a_4$ contacts to complete a holding circuit for itself via line 4 to maintain relay A energized independent of the run switches until the interrupted stroke relay C is energized. Also, relay A closes its contacts $a_8$ in line 8 in series with the anti-repeat relay B.

When both run switches 45 and 46 are depressed, relay B is energized initially via line 8. When so energized, relay B closes its $b_1$, $b_5$, $b_9$, $b_{10}$ and $b_{13}$ contacts and opens its $b_6$ contacts. The $b_9$ contacts now complete a holding circuit for relay B via line 9, which includes the now closed, cam-operated limit switch $1SL_9$. The closing of the $b_{10}$ contacts completes an initial energization circuit for the brake monitor relay M via line 10 because the $a_{10}$ contacts are closed (relay A being energized) and the cam-operated limit switch $4RS_{10}$ also is closed. Such energization of relay M opens its $m_1$ and $m_8$ contacts and closes its $m_5$, $m_{11}$, $m_{12}$, $m_{13}$, $m_{16}$ and $m_{17}$ contacts. The now-closed $m_{11}$ and $m_{12}$ contacts provide a holding circuit for relay M to keep it energized through limit switch $4RS_{10}$ independent of relays A and B. The closing of relay contacts $m_{12}$ also completes a holding circuit for relay M through the cam-operated limit switch $1RS_{12}$.

The energization of relay M, as described, breaks the initial energization circuit for relay B via line 8, leaving that relay's continued energization under the control of its holding circuit via line 9.

The energization of relay M also completes an initial energization circuit for the interrupted stroke relay C via line 13. When so energized, relay C completes a holding circuit for itself by closing its contacts $c_{14}$, so that the continued energization of relay C does not depend on relay A being energized. Relay C also opens its $c_4$ and $c_6$ contacts and closes its $c_{16}$ and $c_{17}$ contacts.

As indicated by the dashed line 54, there is an overlap between the relay contacts $c_{14}$ and $c_4$ such that the $c_4$ contacts cannot open until after the $c_{14}$ contacts close (both in response to the energization of relay C).

Relay A is de-energized when the contacts $c_4$ in its holding circuit (line 4) are opened in response to the energization of relay C, as described. Such de-energization of relay A puts relay M under the control of its holding circuits (lines 11 and 12), and puts relay C under the control of its holding contacts $c_{14}$.

Also, the de-energization of relay A causes its contacts $a_{16}$ to assume their normally-closed condition, and the valve solenoids X and Y become energized through lines 16 and 17 to start the stroke of the machine, as already described in detail with reference to FIG. 1.

At 45° of the crankshaft rotation the cam-operated limit switch $4RS_{10}$ is opened, so that after this point the continued energization of relay M is through the cam-operated limit switch $1RS_{12}$, which remains closed until 210°.

Also, at 45° the cam-operated limit switch $3RS_1$ in line 1 is closed. If the brake monitor relay M has not been energized, as described, then the closing of limit switch $3RS_1$ will complete and energization circuit for the brake fault pilot light 51, which will come on to tell the operator that the brake monitor relay M has failed to be energized. However, if relay M has been energized, its contacts $m_1$ will be open and the pilot light 51 will not be turned on by the closing of limit switch $3RS_1$.

The cam-operated limit switches $2LS_{15}$ and $2RS_{18}$ are closed at 170°, and after this point the operator should release the run switches 45 and 46, leaving the continued energization of the valve solenoids X and Y under the separate control of the now-closed limit switches $2LS_{15}$ and $2RS_{18}$.

At 210° the cam-operated limit switches $1LS_9$ and $1RS_{12}$ are opened. The opening of limit switch $1LS_9$ de-energizes the anti-repeat relay B. The opening of limit switch $1RS_{12}$ de-energizes the brake monitor relay M.

As already explained in the discussion on FIG. 1, the valve solenoids X and Y remain energized until about 335°, at which time the cam-operated limit switches $2LS_{15}$ and $2RS_{18}$ are opened.

The limit switch $4RS_{10}$ is closed shortly before the crankshaft reaches its 360° dead-center position, possibly, about 5° before that point. Switch $4RS_{10}$ also is held closed through the first 45°, for example, of the crankshaft's next rotation. (If desired, the point at which $4RS_{10}$ opens may be anywhere within the range from about 30° to 60°.) If the machine has stopped before limit switch $4RS_{10}$ has been opened, then relay M can be energized initially via line 10 when the run switches 45 and 46 are operated again, as described. However, if the machine has stopped at some point beyond where switch $4RS_{10}$ opens (e.g., at 45°) then relay M cannot be energized and the valve solenoids X and Y cannot be energized for the next stroke of the machine (The limit switch $3RS_1$ in line 1 is set to close at the same point as where limit switch $4RS_{10}$ opens.) The brake fault pilot light 51 in line 1 will come on when the machine operator depresses the run switches 45 and 46 because the limit switch $3RS_1$ will have closed at 45°, relay B will be energized and relay M will be de-energized. This will tell the operator that the failure of the machine to go through the next stroke is due to a failure of the brake 24 to stop the crankshaft 20 within a safe limit past the top dead-center, 360° position where it is supposed to stop.

For "inching" operation of the machine, the selector switch 50 is operated to close its contacts in line 2, and the "inch" switch 53 is operated to close its contacts in lines 19 and 20. This connects both valve solenoids X and Y across the power lines L-1 and L-2, so that the machine will go through its cycle of operation as long as both the selector switch 50 and the "inch" switch 43 remain in these positions.

4-RELAY CONTROL CIRCUIT — FIG. 6

FIG. 6 shows a modification of the present control system which differs primarily from FIG. 1 in that separate relays A' and D are provided for the component checking and dummy plug functions, respectively, instead of having a single relay perform all those functions. Because it has an additional relay, the FIG. 6 circuit is considered less desirable then the FIG. 1 circuit.

In FIG. 6, the coil of the component checking relay A' (line 2) is connected between the stop switch 44 in line 1 and power line L-2 through a normally-closed valve switch $y_2$ (operated by poppet valve 34 in FIG. 2), a normally-closed valve switch $x_2$ (operated by poppet valve 33 in FIG. 2), a set of normally-open contacts $d_2$ of the dummy plug relay D (in line 4), a set of normally-closed contacts $b_2$ of the anti-repeat relay B (in line 6), and normally-closed set of contacts $c_2$ of the interrupted stroke relay C (in line 8).

In line 3, relay A' has a set of normally-open holding contacts $a_3$ which bridge the series-connected contacts $d_2$ and $b_2$ in line 2.

The coil of the dummy plug relay D is connected in series with the normally-closed contacts of the two run switches 45 and 46, in line 4, between the top switch 44 and the power line L-2.

In line 6, the coil of the anti-repeat relay B is connected in series with the normally-open contacts of the run switches 45 and 46 (line 5), the cam-operated limit switches $1LS_6$ and $1RS_6$, a set of normally-closed contacts $d_6$ of the dummy plug relay D, and a set of normally-open contacts $a_6$ of the component checking relay A'.

Lines 7–12 in FIG. 6 are identical to the correspondingly numbered lines in FIG. 1 and therefore need not be described in detail again.

The timing chart of FIG. 2 applies to the limit switches in FIG. 6.

OPERATION

In the operation of the FIG. 6 system, initially the dummy plug relay D is energized through the normally-closed contacts of the run switches 45 and 46 in line 4. Consequently, the $d_2$ contacts are closed and the component checking relay A' is initially energized via line 2 (relays B and C being de-energized because the run switches 45 and 46 are not depressed). When thus energized initially, relay A' closes its contacts $a_3$ to complete a holding circuit for itself which bypasses the $d_2$ and $b_2$ contacts in line 2.

With relay A' energized, its contacts $a_6$ in the initial energization circuit for the anti-repeat relay B are closed.

When the run switches 45 and 46 are depressed, the dummy plug relay D is de-energized and its normally-closed contacts $d_6$ in line 6 close. This completes an initial energization circuit for the anti-repeat relay B. Relay B closes its normally-open contacts $b_7$ in line 7 to complete an initial energization circuit for the interrupted stroke relay C. Relay C closes its contacts $c_8$ in line 8 to complete a holding circuit for itself and a holding circuit for relay B via the latter's now-closed contacts $b_7$. A short time later, relay C opens its normally-closed contacts $c_2$ in line 2 so as to de-energize the component checking relay A. There is a suitable overlap, illustrated schematically by the dashed line 60, between the relay contacts $c_8$ and $c_2$ which insures that contacts $c_8$ close before contacts $c_2$ open when relay C is energized.

In other respects the system of FIG. 6 operates as already described in detail with reference to FIG. 1, and this detailed description will not be repeated.

MONITORING

In the FIG. 6 system the dummy plug relay D must be energized before a stroke of the machine can take place; otherwise relay A' will not be initially energized via line 2. Also, relay D must be de-energized (in response to the operation of the run switches 45 and 46); otherwise, its contacts $d_6$ in line 6 will not open and relays B and C will not be energized initially. If the run switches 45 and 46 are replaced by a dummy plug, then relay D will be energized but relays B and C could not be energized because contacts $d_6$ would be open. Hence, no unexpected stroke of the machine could take place.

Relay A' must be energized before relays B and C can be energized via line 6. Upon the energization of relays B and C, relay A' must be de-energized or else its contact $a_{10}$ will not close in the initial energization circuit for the valve solenoids X and Y.

The other control components of the FIG. 6 system are monitored as already described in the discussion of FIG. 1.

In each of the foregoing embodiments of the present control circuit, an improvement practical advantage is that the failure of any single relay or even the simultaneous failure of all three relays A, B and C cannot result in an unexpected stroke of the machine. Even if all three of these relays failed at the same time, a repeat stroke could not occur unless the operator is depressing the run switches 45 and 46. In that case, the repeat stroke would not be unexpected, but instead would be deliberately sought by the operator, and his hands would be up out of the way. Therefore, the present system completely eliminates one category of control components (the relays) whose failure might endanger the operator of the machine.

It will be understood that the present control system carries forward the active dual-control concept of U.S. Pat. No. 3,004,647. Each control component in the system must go through its cycle of operation once during each operating cycle of the machine.

Mathematically, the probability that two similar control devices or components will fail at the same time is the square of the probability that just one of them will fail. For example, if a relay has a failure probability of 1 in 1,000,000 operations, then the probability of a simultaneous failure of two such relays is 1 in 1,000,000,000,000 operations.

Referring to FIG. 1, after about the 210° rotational position of the crankshaft (when the $1LS_6$ and $1RS_6$ cam-operated limits switches open) the valve solenoids X and Y are energized separately through their respective holding circuits in lines 9 and 12. That is, the valve solenoids are isolated from each other, electrically and also mechanically since the respective limit switches $2LS_9$ and $2RS_9$ are operated by cams on different cam shafts L and R. Also, the pilot valves 37 and 38 (FIG. 3) which the valve solenoids control are independent of each other pneumatically.

A repeat stroke could occur only if both poppet valves 33 and 34 remain open at the end of a stroke. This would require a simultaneous failure of two control components, paired in one of the following possible situations:

(1) cam operated limit switches $2LS_9$ and $2RS_{12}$ both fail to open, thereby keeping solenoids X and Y energized; or (2) switch $2LS_9$ fails to open and valve 34 fails to close due to some mechanical or other malfunction, despite the de-energization of the solenoid Y for its pilot valve 37; or (3) switch $2RS_{12}$ fails to open and valve 33 fails to close due to some mechanical or other malfunction, despite the de-energization of the solenoid X for its pilot valve 36; or (4) both valves 33 and 34 fail to close due to mechanical or other malfunctions, despite the de-energization of the solenoids X and Y for their respective pilot valves.

Assuming a failure probability of 1 in 1,000,000 for each of these control devices, the probability of a simultaneous failure of any such pair (which would be necessary for a repeat stroke to occur) becomes infinitesimally small (1 in 230 billion operations.

I claim:

1. In a single cycle control system for a machine in which fluid pressure controls the starting and stopping of the machine and having a downstroke followed by a return upstroke, said system having:

first and second normally-closed valves connected to control said fluid pressure such that the machine is stopped if either valve is closed;

first and second solenoids for controlling said valves individually such that each solenoid must be energized to open the corresponding valve;

and a pair of run switches, each having normally-closed contacts which are closed when the switch is released and normally-open contacts which are closed when the switch is operated;

the improvement which comprises three relays operatively connected to said run switches and said solenoids (1) to energize both solenoids in response to the operation of both run switches, whereby to start the downstroke of the machine, (2) to de-energize at least one of said solenoids in response to the release of either run switch during substantially the entire downstroke of the machine, whereby to stop the downstroke, and (3) to maintain said last-mentioned solenoid de-energized until both run switches are released and thereafter both run switches are operated again.

2. A control system according to claim 1, wherein said relays are operatively connected to said run switches and said solenoids to de-energize both solenoids in response to the release of either run switch during substantially the entire downstroke of the machine.

3. A control system according to claim 2, and further comprising:

a first holding circuit connected directly to said first solenoid, and including a normally-open limit switch which is closed by the machine at the completion of substantially the entire downstroke for maintaining the first solenoid energized independent of the run switches for substantially the remainder of the cycle of operation of the machine;

and a second holding circuit separate from said first holding circuit and connected directly to said second solenoid, said second holding circuit including a normally-open limit switch which is closed by the machine at the completion of substantially the entire downstroke and being operable to maintain said second solenoid energized independent of the run switches for substantially the remainder of the cycle of operation of the machine.

4. In a single cycle control system for a machine is which fluid pressure controls the starting and stopping of the machine and having a vertically reciprocable part which is movable through a downstroke and then through an upstroke during each cycle, said system having:

a pair of valves connected to control said fluid pressure such that the machine is stopped if either valve is closed;

a pair of solenoids for controlling said valves individually such that each solenoid must be energized to open the corresponding valve;

a first relay;

a pair of run switches, each having normally-closed contacts which are closed when the switch is released and normally-open contacts which are closed when the switch is operated;

an energization circuit for said first relay including the normally-closed contacts of said two run switches;

and second and third relays operatively connected to said solenoids such that both said second and third relays must be energized for both said solenoids to be energized throughout substantially the entire downstroke of the machine;

the improvement which comprises:

an initial energization circuit for said second relay which includes normally-open contacts of said first relay, whereby said first relay must be energized through said normally-closed contacts of both run switches before the second relay can be energized;

an initial energization circuit for said third relay which includes normally-open contacts of said second relay, whereby said second relay must be energized before said third relay can be energized;

and holding circuits for the second and third relays which include normally-open contacts of the second and third relays;

said holding circuits for said second and third relays being connected to said normally-open contacts of both run switches, whereby releasing either run switch from its operated position will open both said holding circuits and thus de-energize the second and third relays.

5. In a single cycle control system for a machine in which fluid pressure controls the starting and stopping of the machine, said control system having:

first and second normally-closed valves connected to control said fluid pressure such that the machine is stopped if either valve is closed;

first and second solenoids for causing the corresponding valves to open in response to the energization of the respective solenoids;

run switch means for starting the machine;

and circuit means for energizing said solenoids in response to the operation of said run switch means, whereby to open said valves and start the machine;

the improvement which comprises:

a first holding circuit connected directly to said first solenoid and operable to maintain the latter energized independent of said run switch means following the opening of said first valve, said holding circuit including a normally-open limit switch which is closed by the machine during its cycle of operation and is opened later near the end of said cycle;

and a second holding circuit connected directly to said second solenoid and operable to maintain the latter energized independent of said run switch means following the opening of said second valve, said second holding circuit being separate from said first holding circuit and including a normally-open limit switch which is closed by the machine during its cycle of operation and is opened later near the end of said cycle.

6. A control system according to claim 5, and further comprising normally-closed limit switch means operatively connected to control the energization of said anti-repeat relay and said interrupted stroke relay following said operation of said run switch means, said normally-closed limit switch means being opened by the machine during its cycle of operation to de-energize said anti-repeat relay and said interrupted stroke relay.

7. A control system according to claim 6, wherein said normally-closed limit switch means comprises a pair of normally-closed limit switches connected between said run switch means and said anti-repeat relay and said interrupted stroke relay to control the energization of said anti-repeat relay and said interrupted stroke relay.

8. A control system according to claim 6, and further comprising:

a fourth relay having a set of normally-open contacts connected in series with said interrupted stroke relay to control the latter's energization;

and wherein said normally-closed limit switch means comprises:

a normally-closed switch connected in series with said anti-repeat relay to control its energization;

and a normally-closed switch connected in series with said fourth relay to control its energization.

9. A control system according to claim 5, wherein:

said first holding circuit includes a normally-open first valve switch which is closed by said first valve while the latter is open;

and said second holding circuit includes a normally-open second valve switch which is closed by said second valve while the latter is open.

10. A control system according to claim 5, wherein said circuit means for energizing the solenoids in response to the operation of said run switch means comprises:

a component checking relay operatively connected to be energized before said operation of the run switch means;

an anti-repeat relay operatively connected to said component checking relay and to said run switch means to be energized in response to said operation of the run switch means after said component checking relay is energized;

an interruped stroke relay operatively connected to said anti-repeat relay to be energized in response to the latter's energization and operatively connected to said component checking relay to de-energize the latter in response to the energization of the interrupted stroke relay;

and an initial energization circuit for each of said solenoids including said run switch means, a normally-closed set of contacts of said component checking relay, and a normally-open set of contacts of said interrupted stroke relay, whereby said run switch means must be operated while said component checking relay is de-energized and said interrupted stroke relay is energized in order to complete said initial energization circuit for each solenoid.

11. A system according to claim 10, wherein said initial energization circuit for each of said solenoids also includes a normally-open set of contacts of said anti-repeat relay, whereby said run switch means must be operated while said anti-repeat relay also is energized in order to complete said initial energization circuit for each solenoid.

12. A control system according to claim 10, wherein said first holding circuit includes a normally-open first valve switch which is closed by said first valve while the latter is open;

and said second holding circuit includes a normally-open second valve switch which is closed by said second valve while the latter is open.

13. A control system according to claim 10, wherein said component checking relay has an initial energization circuit comprising:

normally-closed contacts of said run switch means;

a normally-closed valve switch which is opened by said first valve while the latter is open;

a normally-closed valve switch which is opened by said second valve while the latter is open;

a set of normally-closed contacts of said anti-repeat relay;

and a set of normally-closed contacts of said interrupted stroke relay; and wherein:

said first holding circuit includes a normally-open first valve switch which is closed by said first valve while the latter is open;

and said second holding circuit includes a normally-open second valve switch which is closed by said second valve while the latter is open;

and further comprising:

normally-closed limit switch means operatively connected to control the energization of said anti-repeat relay and said interrupted stroke relay following said operation of said run switch means, said normally-closed limit switch means being opened by the machine during its cycle of operation to de-energize said anti-repeat relay and said interrupted stroke relay.

14. A control system according to claim 10, wherein said component checking relay has an initial energization circuit comprising:

normally-closed contacts of said run switch means;

a normally-closed valve switch which is opened by said first valve while the latter is open;

a normally-closed valve switch which is opened by said second valve while the latter is open;

a set of normally-closed contacts of said anti-repeat relay;

and a set of normally-closed contacts of said interrupted stroke relay.

15. A control system according to claim 14, wherein said component checking relay has a holding circuit for maintaining it energized independent of its initial energization circuit, said holding circuit comprising a set of normally-open contacts of said component checking relay and a set of normally-closed contacts of said interrupted stroke relay.

16. A control system according to claim 10, and further comprising normally-closed limit switch means operatively connected to control the energization of said anti-repeat relay and said interrupted stroke relay following said operation of said run switch means, said normally-closed limit switch means being opened by the machine during its cycle of operation to de-energize said anti-repeat relay and said interrupted stroke relay.

17. A control system according to claim 16, wherein said normally-closed limit switch means comprises a pair of normally-closed limit switches connected between said run switch means and said anti-repeat relay and said interrupted stroke relay to control the energization of said anti-repeat relay and said interrupted stroke relay.

18. A control system according to claim 16, and further comprising:

a fourth relay having a set of normally-open contacts connected in series with said interrupted stroke relay to control the latter's energization;

and wherein said normally-closed limit switch means comprises:

a normally-closed switch connected in series with said anti-repeat relay to control its energization;

and a normally-closed switch connected in series with said fourth relay to control its energization.

19. In a single cycle control system for a machine in which fluid pressure controls the starting and stopping of the machine, said control system having:

first and second normally-closed valves connected to control said fluid pressure such that the machine is stopped if either valve is closed;

first and second solenoids for causing the corresponding valves to open in response to the energization of the respective solenoids;

run switch means for starting the machine;

a first relay operatively connected to be energized before said run switch means is operated to start the machine;

a second relay operatively connected to said run switch means to be energized in response to said operation of the run switch means;

and a third relay operatively connected to said second relay to be energized in response to the latter's energization and operatively connected to said first relay to de-energize the latter in response to the energization of the third relay;

the improvement which comprises an initial energization circuit for each solenoid comprising:

a normally-closed set of contacts of said first relay, and a normally-open set of contacts of said third relay connected between said run switch means and the respective solenoid for energizing the latter when said run switch means is operated while said first relay is de-energized and said third relay is energized.

20. A control system according to claim 19, and further comprising a pair of normally-closed limit switches which are operatively connected to control the energization of said second and third relays following said operation of said run switch means and which are opened by the machine during its cycle of operation to de-energize said second and third relays.

* * * * *